Nov. 29, 1927. 1,650,611
R. M. CRAVENS
RESILIENT VEHICLE WHEEL
Filed March 9, 1926
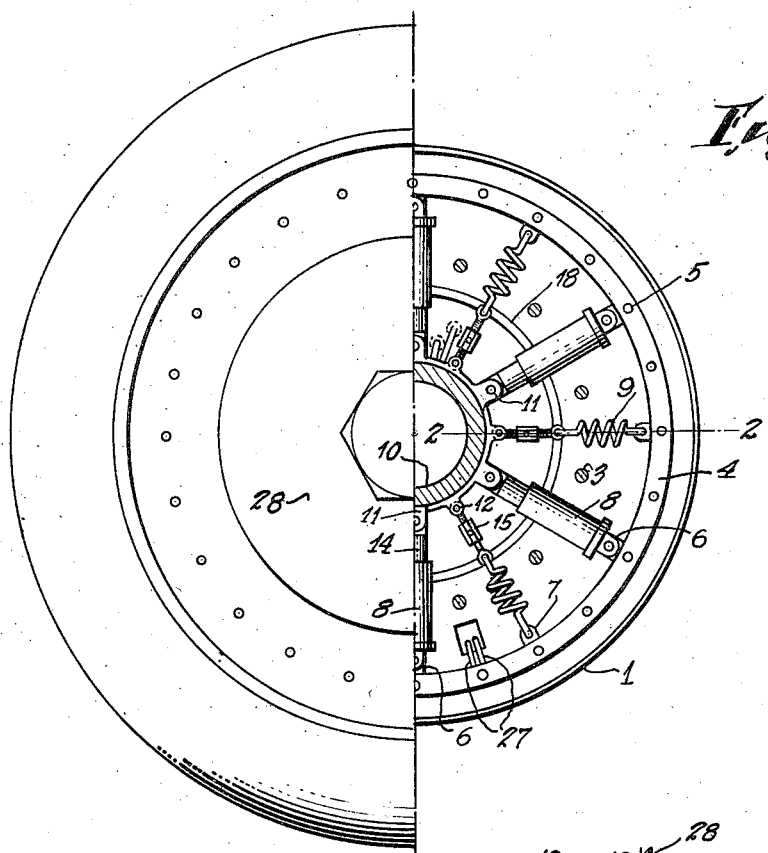
Fig. 1
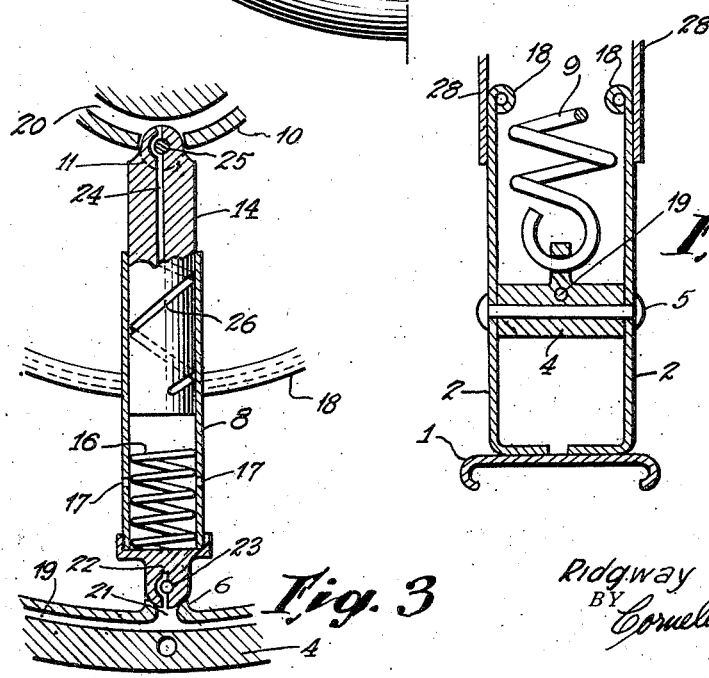
Fig. 2
Fig. 3
INVENTOR.
Ridgway M. Cravens
BY
Cornelius Gabriske
ATTORNEYS.

Patented Nov. 29, 1927.

1,650,611

UNITED STATES PATENT OFFICE.

RIDGWAY M. CRAVENS, OF BROOKLYN, NEW YORK.

RESILIENT VEHICLE WHEEL.

Application filed March 9, 1926. Serial No. 93,441.

This invention is a resilient wheel, and, more particularly, a resilient disk wheel for motor vehicles.

The object of the invention is to provide a simple and highly efficient vehicle wheel of the disk type which may be used in conjunction with either pneumatic or solid tires and which, by virtue of its own inherent resiliency will absorb road shocks and vibration without relying upon the resiliency of the tire in the fulfillment of its function.

Speaking generally, the invention embodies a suitable rim, to which either a pneumatic or solid tire may be attached. To the inner circumference of this rim is secured a pair of annular disks, the inner peripheries of which are spaced apart by suitable means. Between these disks is secured a ring which will hereinafter be termed a disk ring. To the disk ring a plurality of cylinders are pivoted and extend in an inward radial direction, and between each two cylinders a tension spring is secured to the ring and also extends in an inward radial direction.

A suitable sleeve, adapted to fit a conventional hub, is provided on its outer periphery with a number of lugs, to certain of which are pivoted pistons which project into the cylinders of the disk ring while the springs to which I have referred are secured to the other lugs preferably by interposed turnbuckles, so that the tension of these springs may be adjusted. The hub is thus spaced from the rim by the conjoint action of the springs and cooperating pistons and cylinders, so that said wheel embodies, in effect, a combination spring and pneumatic wheel.

An important feature of the invention consists in the means whereby the movable parts of the wheel may be properly lubricated at all times, so as to permit the operation of the parts without friction.

The central portions of the disks are cut away to provide sufficient clearance between their inner peripheries and the sleeve to permit operation of the pistons within the cylinders without permitting the disks to strike the sleeve. The space between the inner peripheries of these disks and the sleeve is enclosed by two supplemental disks carried by the hub or sleeve and bearing against the outer faces of the two annular disks adjacent their inner margins. The supplemental disks serve to cover and conceal the interior operating parts of the wheel and exclude extraneous matter from the interior of such wheel.

In order to brace the wheel against lateral thrusts, the inner peripheries of the annular disks are flanged inwardly toward one another and are adapted to engage with the cylinders in the event of lateral thrust. The rim of the wheel is precluded from running way from the hub, and vice versa, by means of tie members which extend between the annular disks in proximity to the cylinders and are adapted to be engaged by the cylinders to limit relative rotation between the hub and the rim.

The wheel of this invention is unusually simple in construction, but, in practice, it is highly efficient in the performance of its intended functions. The parts are such that they will not be apt to get out of order and the wheel will function indefinitely in a thoroughly efficient, practical and economical manner.

Features of the invention, other than those specified, will be apparent from the hereinafter detailed description and claims, when read in conjunction with the accompanying drawing.

The accompanying drawing illustrates one practical embodiment of the invention, but the construction therein shown is to be understood as illustrative, only, and not as defining the limits of the invention.

Figure 1 shows the wheel of the present invention partly in side elevation and partly in section. In the sectional part of this view, the tire, rim and the two disks on the near side of the wheel are removed and the sleeve shown in section.

Figure 2 is a fragmental section on the line 2—2 of Figure 1; and,

Figure 3 is a fragmental radial section taken in the plane of the wheel and showing in section a portion of the sleeve and disk ring and one cylinder and piston.

Referring to the drawings, 1 designates the rim of the wheel, which may be adapted to carry either a solid or pneumatic tire. To the inner periphery of this rim is secured two annular disks 2 which are secured to one another by tie bars or bolts 3, adjacent their inner peripheries. Between these disks is positioned a ring 4, which is rigidly secured to the disks by bolts or rivets 5, which extend through both disks and through the interposed ring. The ring 4 is provided around its inner periphery with lugs 6 and 7. To each lug 6 is pivoted a cylinder 8, and to each lug 7 is secured one end of a tension spring 9.

10 designates a sleeve adapted to fit over a conventional hub and to be secured thereto against rotation as by keying or the like. This sleeve has two series of lugs 11 and 12 on its outer periphery. To each lug 11 is pivoted a piston 14 extending into one of the cylinders 8, and to each lug 12 is secured a turnbuckle 15, the opposite end of which is attached to one of the springs 9. By adjusting the turnbuckles, the springs 9 may be tensioned as desired.

In each cylinder 8, an additional spring 16 is positioned as shown in Fig. 3. This is a relatively short compression spring which, in practice, is adapted not to be engaged by the piston until such piston nears the end of its stroke, whereby the piston is cushioned at this time. The hub is thus supported from the rim by the conjoint operation of the springs 9 and the cooperating pistons and cylinders, which I have described. The pistons may, in practice be made relatively tight and the cylinders may be provided with air escape openings 17 as shown in Figure 3.

The wheel is properly braced against lateral strains by coiling or rolling the inner edges of the disks 2 to provide flanges 18, as shown in Fig. 2, and these flanges extend into relatively close proximity to the cylinders 8 to be engaged thereby when the wheel is subjected to lateral thrusts. To preclude the rim from running away from the hub and vice versa, the tie elements 3 are positioned in relatively close proximity to the cylinders to engage therewith and limit the degree of rotation to which the hub and rim is susceptible. The wheel is thus properly safeguarded against lateral thrusts and driving and braking strains.

In order that the parts may be properly lubricated, the disk ring 4 is provided with a duct 19, see Figure 3, and the sleeve 10 is provided with a similar duct 20. The duct 19 has a branch duct 21, extending into each lug 6, and the pivoted end of the corresponding cylinder is provided with a duct 22, extending to and around the pivot 23. Similarly, the piston has a duct 24 which connects with the duct 20, and extends around the pivot pin 25 and thence to the exterior of the piston where it is formed into a helical groove 26 on the outer surface of the piston. Oil is adapted to be introduced into the ducts 19 and 20 in any suitable way, as for example, through the tubes 27, which lead into the duct 19. The duct 20 is similarly fed. The tubes 27 extend to the exterior of the wheel so that an oil or grease gun may be attached to one of them and the lubricants applied until it is forced out of the other. When the grease or oil begins to flow from the tube other than that into which it is fed, the operator will know that the system is filled with lubricant.

In the operation of the wheel, centrifugal force will maintain the parts properly lubricated by causing the flow of grease or oil as will be understood.

In order to cover and conceal the opening between the inner peripheries of the annular disks 2 and the hub, supplemental disks 28 are provided. These disks are of such size that they will overlap the annular disks after the manner shown in Figure 2.

The disks are secured to the hub or sleeve in any suitable manner to cause the ribs of the supplemental disks to be maintained at all times against the annular disks. In practice, the supplemental disks may be held in place by bolts. In any case, the supplemental disks are maintained continually in contact with the annular disks of the wheel.

It will be apparent from the structure which I have described that the hub is not rigidly secured to the rim of the wheel, but that, in contradistinction, these parts are adapted for limited relative rotation. This is of advantage, since such relative movement is of a cushioned or yielding character and not only produces more flexible braking, but also eliminates undue strains occasioned by uneven transmission of power from the prime mover of the vehicle. Even though the transmission of power be unsteady, the fluctuations thereof will be in effect, smoothed out while being transmitted from the hub to the rim of the wheel as described.

The foregoing detailed description sets forth the preferred practical form of the invention, but the invention is to be understood as fully commensurate with the appended claims.

Having thus fully described the invention, what I claim as new and desire to secure by Letters Patent is:

1. A resilient wheel embodying a hub, a rim, a pair of spaced apart annular disks secured to the rim and extending toward the hub, a ring positioned between said disks and rigidly secured thereto, said ring being provided with a lubrication duct therein, a sleeve also provided with a lubrication duct and associated with the hub, a plurality of cylinders pivotally connected to the ring and having lubrication ducts communicating with the duct of said ring, a plurality of pistons pivotally associated with the sleeve and having ducts connected to the duct of the sleeve, said pistons extending into the cylinders, and means for limiting the pivotal movement of the pistons to a predetermined extent.

2. A resilient wheel embodying a hub, a rim, a pair of spaced apart annular disks secured to the rim and extending toward the hub, a ring positioned between said disks and rigidly secured thereto, said ring being provided with a lubrication duct therein, a sleeve also provided with a lubrication duct and associated with the hub, a plurality of cylinders pivotally connected to the ring and having lubrication ducts communicating with the duct of said ring, a plurality of pistons pivotally associated with the sleeve and having ducts connected to the duct of the sleeve, said pistons extending into the cylinders, and the ducts of the pistons extending to the exterior faces of the pistons to lubricate the cylinder walls, means for supplying lubricant to the lubrication ducts of the sleeve and ring, and means for precluding pivotal movement of the cylinders beyond predetermined limits.

3. A resilient wheel embodying a hub, a rim, a pair of spaced apart annular disks secured to the rim and extending toward the hub, a ring positioned between said disks and rigidly secured thereto, said ring being provided with a lubrication duct therein, a sleeve also provided with a lubrication duct and associated with the hub, a plurality of cylinders pivotally connected to the ring and having lubrication ducts communicating with the duct of said ring, a plurality of pistons pivotally associated with the sleeve and having ducts connected to the duct of the sleeve, said pistons extending into the cylinders, and the ducts of the pistons extending to the exterior faces of the pistons to lubricate the cylinder walls, means for supplying lubricant to the lubrication ducts of the sleeve and ring, means for precluding pivotal movement of the cylinders beyond predetermined limits, flanges carried by the disks and extending into substantial engagement with the cylinders to strengthen the wheel against lateral thrusts, tension springs interposed between the sleeve and the ring to assist the pistons and cylinders in supporting the hub from the rim, and supplemental disks for enclosing the space between the inner edges of the annular disks and the hub.

4. A resilient wheel embodying a hub, a rim, a pair of spaced apart annular disks secured to the rim and extending toward the hub, a ring positioned between said disks and rigidly secured thereto, said ring being provided with a lubrication duct therein, a sleeve also provided with a lubrication duct and associated with the hub, a plurality of cylinders pivotally connected to the ring and having lubrication ducts communicating with the duct of said ring, a plurality of pistons pivotally associated with the sleeve and having ducts connected to the duct of the sleeve, said pistons extending into the cylinders, and the ducts of the pistons extending to the exterior faces of the pistons to lubricate the cylinder walls, means for supplying lubricant to the lubrication ducts of the sleeve and ring, means for precluding pivotal movement of the cylinders beyond predetermined limits, flanges carried by the disks and extending into substantial engagement with the cylinders to strengthen the wheel against lateral thrusts, tension springs interposed between the sleeve and the ring to assist the pistons and cylinders in supporting the hub from the rim, and supplemental disks for enclosing the space between the inner edges of the annular disks and the hub, and means for maintaining the outer margins of the supplemental disks in engagement with the inner margins of the annular disks.

RIDGWAY M. CRAVENS.